United States Patent [19]

Taylor et al.

[11] Patent Number: 5,283,071

[45] Date of Patent: Feb. 1, 1994

[54] PROCESS FOR PREPARING A PASTA FOOD PRODUCT

[75] Inventors: William I. Taylor; Terri Taylor, both of Creve Coeur, Mo.

[73] Assignee: Pastizza's, St. Louis, Mo.

[21] Appl. No.: 897,609

[22] Filed: Jun. 10, 1992

Related U.S. Application Data

[63] Continuation-in-part of Ser. No. 772,222, Oct. 7, 1991, abandoned.

[51] Int. Cl.⁵ .................... A23L 1/16; A23P 1/08
[52] U.S. Cl. .................... 426/274; 426/557; 426/558
[58] Field of Search .......... 426/274, 557, 516, 517, 426/138, 558

[56] References Cited

U.S. PATENT DOCUMENTS

| | | | |
|---|---|---|---|
| 820,899 | 5/1906 | Williams | 426/138 |
| 4,816,281 | 3/1989 | Moriyama et al. | 426/557 |
| 4,828,852 | 5/1989 | Hsu et al. | 426/274 |
| 4,882,191 | 11/1989 | Bastetti et al. | 426/557 |
| 4,973,487 | 11/1990 | Wyss et al. | 426/557 |
| 5,030,462 | 7/1991 | Brimelow et al. | 426/557 |
| 5,063,072 | 11/1991 | Gillmore et al. | 426/557 |

OTHER PUBLICATIONS

"The Oriental Cook Book" Better Homes and Gardens Meredith Corporation Des Moines Iowa 1977 pp. 80-81.

Primary Examiner—Arthur L. Corbin
Attorney, Agent, or Firm—Rogers, Howell & Haferkamp

[57] ABSTRACT

A method for preparation of a pasta-based foot product is disclosed The method comprises several steps. Pieces of pasta are cooked to form pieces of cooked pasta. The cooked pasta is mixed with a binding composition comprising a binding agent that is either soy protein or an egg white composition consisting of either egg whites or a mixture of powdered egg white and water. The pasta and binding agent are mixed in a cooked pasta to binding agent weight ratio of from about 40:1 to about 10:1, to form a pasta/egg white mixture. A desired amount of the mixture is formed into a desired shape and the desired shape of mixture is baked until the pieces of cooked pasta adhere together, yet remain moist A pasta-based food product prepared by such method is also disclosed.

18 Claims, No Drawings

PROCESS FOR PREPARING A PASTA FOOD PRODUCT

This is a continuation-in-part of copending application 07/772,222 filed on Oct. 7, 1991, now abandoned.

BACKGROUND OF THE INVENTION

1. Field of the Invention

The present invention relates to food products and methods for preparation of food products, and more particularly to a novel pasta-based food product and a method for preparation thereof.

2. Description of the Prior Art

Foods that are prepared quickly and with a minimum of inconvenience have become increasingly popular In fact, the demand for ever more convenient and quickly prepared foods is seemingly insatiable. Frozen pre-cooked foods are especially suitable for this demand and, as a result, are becoming more and more plentiful in supermarkets.

Of the conveniently and quickly prepared foods, pizza and pasta in particular have recently experienced a significant growth in popularity. Frozen pizzas have been popular for years. And even though pasta is generally simple to prepare from raw stock, the public's interest in even simpler, less time consuming food preparation has resulted even in more convenient, pre-cooked pastas that require only simple reheating.

A wide variety of pastas have also become popular. Typically pasta dishes are of the Italian variety and comprise a jumble of separate independent pieces of pasta in a sauce, e.g., spaghetti, cavatelli, etc. However, because of the large number of separate and independent pieces of pasta coated in sauce, a serving of pasta can be inconvenient to eat on the run, and usually requires the use of a fork.

Other ethnic varieties of pasta dishes also exist. For example, kugel, while not generally considered a convenience food, is a dish prepared by mixing wide, flat noodles and whole eggs in a ratio such as a pound of dry noodle stock to six or eight eggs, and other ingredients and baking the mixture typically for an hour to an hour and a half. The result is a product in which eggs fill in voids between the pieces of pasta, and thus a generally solid mass of noodles, egg and other ingredients.

Nevertheless, despite the increases in the kinds and availability of convenience foods, consumers desire even further variety. Moreover, in today's health-conscious society, many consumers have a particular interest in foods they consider to be healthy, especially foods low in saturated fat and cholesterol content. Saturated fats and cholesterol have been a particular concern with respect to pizzas, which aside from their toppings, have precrusts viewed by many as undesirably high in saturated fats and cholesterol. On the other hand, pastas, certain variations of which can be prepared such that they are low in saturated fats and cholesterol, typically are not as conveniently prepared by consumers as are frozen pizzas, and are not as conveniently eaten, usually requiring the use of a fork and plate. Thus, the consuming public is constantly seeking new varieties of foods, and even new varieties of pizzas and pastas, not only for a variety of tastes, but also for convenience and health reasons.

SUMMARY OF THE INVENTION

Briefly, therefore, the present invention is directed to a novel method for preparation of a ready-to-reheat pasta-based food product. The method comprises the following steps. Pieces of pasta are cooked to form pieces of cooked pasta, which is then mixed with a binding composition, which comprises a binding agent, namely, soy protein or an egg white composition that is either standard egg white itself or a mixture of powdered egg white and water. The cooked pasta to binding agent (soy protein or egg white composition) weight ratio is in the range of from about 40:1 to about 10:1. A pasta./egg white mixture is thereby formed. A desired amount of the mixture is then formed into a desired shape and the desired shape of mixture is baked until the pieces of cooked pasta adhere together, yet remain moist.

The present invention is also directed to a pasta-based food product produced by such method.

Among the several advantages found to be achieved by the present invention, therefore, may be noted the provision of a method for preparation of a convenient, ready-to-reheat pasta-based food product; the provision of such method that provides a product that is convenient to eat and sufficiently rigid to serve as a hand-held host for toppings, yet remains moist and of desirable taste and texture; the provision of such method that produces a product with open voids free of visible binding agent thus to give the appearance and feel of individual, discrete pieces of pasta, but which forms a platform that significantly prevents leakage of liquid toppings all the way therethrough; and the provision of a pasta-based food product of such characteristics.

DESCRIPTION OF THE PREFERRED EMBODIMENTS

In accordance with the present invention, it has been discovered that mixing cooked pasta with a relatively small amount of soy protein or egg white and baking the mixture for a few minutes results in a novel pasta-based food product that surprisingly retains the texture and consistency of discrete pieces of pasta of desired moisture and texture (e.g., al dente), yet the conglomeration of pieces of pasta maintains a desired shape and provides sufficient rigidity to serve as an effective host for a variety of toppings and to be eaten by hand as a pseudo-pizza with or without toppings. Moreover, the product can be frozen for distribution and storage and the consumer may heat the frozen product (or a fresh unfrozen product) conveniently in any type of oven, even a microwave oven, to be ready to eat within just a few minutes.

The product may be prepared as follows. Raw pasta cooked by standard techniques, such as in hot water until the desired texture and moisture for example, al dente is achieved; that is, until cooked just enough to retain a somewhat firm texture. According to the preferred method, the hot water, which may contain other compositions (e.g., salt or, possibly, a small amount of oil), is maintained at about 200° to 212° F., the pasta is placed in a copious amount of the water (at least enough to completely cover the pasta), and the pasta is cooked in the hot water for about twelve to fifteen minutes Upon removing the pasta from the hot water at the end of this period, the cooking of the pasta is halted immediately by chilling the pasta, such as by drenching the pasta with cold water and draining it.

Nearly any type of pasta may be employed. For example, pasta of cork-screw or shell shaped or a mix of pasta types may be used to form a void-filled, yet "non-leaky" pseudopizza. However, pasta of the form of long, thin noodles (e.g., several inches long and less than about ⅛ inch thick) is preferred. Such long, thin noodles can be mixed to form a tangled mass, which provides a "nesting" which, after baking, holds together and contains open voids through which pieces of pasta at various levels in the product are visible, but forms a platform through which portions of toppings to be added to the product do not readily leak through. Although a variety of such noodles, such as spaghetti, fettucini and linguine may yield satisfactory results, it has been found that linguine is especially well suited for the product. In particular, it has been found that smaller noodles retain less water and so require a greater mass of raw pasta to form an impervious nesting, i.e., a nesting through which sauces do not readily pass and leak out. In other words, finer noodles are more likely to leave voids that can extend through the product and permit a topping such as tomato sauce to leak through the product. The product is therefore not only more costly, but denser and heavier, which is often an undesirable characteristic for such foods. On the other hand, thicker or wider noodles than linguine noodles, for example, fettucini noodles, retain more water and so likewise result in a heavier product when incorporated therein.

Next, a binding composition is mixed with the cooked (and cooled and drained) pasta. The binding composition comprises a binding agent (either soy protein or an egg white composition) and, preferably, a flavoring composition. The soy protein may be in the form of a soy protein isolate. However, the egg white composition is much preferred over the soy protein because the egg white composition has been found to be a stronger binder between pasta pieces. The egg white composition can be any of a number of compositions containing fresh or reconstituted egg whites, for example, fresh egg whites, a mixture of powdered egg white and water, frozen egg whites, fresh whole eggs, frozen whole eggs or a mixture of whole egg powder and water. Because of the dangers of bacteria formation in fresh eggs, powdered egg white mixtures are most preferred. Moreover, it has been found that compositions prepared from powder tend to mix more thoroughly with the pasta and maintain the distribution through the pasta than do fresh egg compositions. In fact, when fresh whole eggs are used, the yolks have been found to have a tendency to gravity to the bottom of the pasta mixture. In addition, mixing powder with water has been found to result in some frothing that tends to cling to the pieces of pasta, whereas fresh eggs or egg whites tend to flow off the pasta pieces, to settle to the bottom of the pasta mixture and to drip off the pasta as it is transferred out of the mixing container. Further, because of the health concerns relative to egg yolks, it is preferred that egg yolks not be included in the binding composition. Thus, the most preferred form of the egg white composition is a mixture of powdered egg white and water.

If powdered egg white is used, a powdered egg white to water weight ratio of about 1:3 has been found to be optimal. Although other ratios such as 1:2 or 1:4 may be used, it has been found that the 1:3 ratio strikes a desirable balance between binding strength (i.e., the ability of the binding composition to cause the pieces of pasta to each other), which decreases as water content increases, and cost, which increases as water content decreases.

The binding composition, if so desired, may also include various flavorings, such as herbs and spices The flavorings selected and the relative amounts of the flavorings may be according to taste Typical of such flavorings may be noted salt, pepper, garlic powder, parsley, basil, nutmeg and oregano. However, the flavoring possibilities are virtually limitless and may be selected according to standard culinary techniques.

The binding composition is mixed with the cooked pasta in an amount sufficient to bind the pieces of pasta together, typically in a cooked pasta to soy protein or egg white composition weight ratio of from about 40:1 to about 10:1, preferably about 40:1 to about 25:1, to form a pasta/binder mixture. In addition, other food products may be included in the mixture by including them with the binding composition or by adding them separately. Such other food products included those utilized as pizza toppings, such as cheese, chopped onion, mushrooms, olives, vegetables (e.g., broccoli, tomato, green pepper, zucchini or cauliflower pieces), delicatessen meats (e.g., sausage, pepperoni or ham), anchovies and the like. Other appropriate food products will be readily apparent to those familiar with pizzas and pastas.

The mixture may then be subdivided into smaller portions, each of which is placed into a pan of desired shape. Preferably the pan is of the nonstick variety. The portion of mixture in the pan is then tamped down to a desired height. For example, about ten ounces of the mixture may be measured out and placed into a seven-inch diameter pizza pan and tamped down to a height of about ⅜ inch to about ½ inch, thereby forming a product in the general shape of a disk. The pan containing the mixture is then placed in an oven (such as a gas-fired conveyor oven) that is set to about 500° F., and the mixture in the pan is baked for about four minutes. Upon removal from the oven, the pan is flipped over and the product falls out.

The product may then be allowed to cool to room temperature. If desired, the product may be topped with a sauce or other topping and eaten or chilled or frozen for distribution and later consumption. If chilled or frozen, the product may be reheated by placing it in an oven, whether conventional, convection or even microwave, for just a few or several minutes, depending on the type of oven, (at about 375° F. to about 425° F. in the case of conventional or convection ovens), at which point it returns to the characteristics it had before cooling and freezing. Thus, the product is a firm nest of non-pasty, moist pieces of pasta (al dente) adhered together The binding agent, either egg whites or soy protein, is included in such a relatively small amount that it is not noticeable by sight. That is, individual pieces of pasta (and the other food products added to the mixture) are seen as discrete pieces (long, thin pasta beings seen as interwoven strands) that adhere together, and not as a solid mass with voids within the nest being filled in with egg white. Thus, pieces of pasta (and other added food products) at lower levels of the nest are visible through voids in the upper levels of the nest, and are not obscured by excess egg white or other binding agent. Yet, despite the presence of the voids, generally no significant void extends completely through the nest, and what voids do extend through typically form such a tortuous path that little, if any, topping (even liquid sauces) readily leak through the nest. The nest thereby provides a good host for liquid toppings such as pizza sauce.

If desired, the product may be topped with a food topping either before or after freezing Typical of such toppings are pizza toppings and pasta food products as discussed above and other pizza or pasta toppings such as sauces, for example, pizza sauce, spaghetti sauce, marinara sauce, other types of tomato sauce, cream sauce, mushroom sauce, pesto sauce and the like.

The following example describes preferred embodiments of the invention. Other embodiments within the scope of the claims herein will be apparent to one skilled in the art from consideration of the specification or practice of the invention as disclosed herein. It is intended that the specification, together with the example, be considered exemplary only, with the scope and spirit of the invention being indicated by the claims tages and proportions are given on a weight basis unless otherwise indicated.

EXAMPLE

Raw ten-inch long linguine stock (2 lb.) was broken into approximately five-inch long pieces and placed in a 250-gallon boiler and covered with water having a temperature of about 200° to 212° F. and the linguine was cooked at that temperature for 12 to 15 minutes, until the linguine was *al dente*. The linguine was drained of the hot water, quenched with cold water and drained.

A binding mixture (2 to 3 oz.) was mixed with the cooked linguine, which weighed about five pounds after cooking. The binding mixture contained seasonings and about three parts water to about one part powdered egg white. The following seasonings were included in the binding mixture: coarse black pepper (½ teaspoon), garlic powder (1 teaspoon), parsley flakes (1 heaping teaspoon), sweet basil (¾ teaspoon), ground nutmeg (½ teaspoon) and salt (1 teaspoon). Then, chopped broccoli (2 oz.) and white onion (2 oz.) were mixed in with the linguine. A portion of the resulting mixture (10 oz.) was weighed out and placed into a 7-inch diameter, nonstick pizza pan and tamped down with a nonstick press to a height of about ⅜ to ½ inch. The pan was then placed into a 500° F. gas-fired conveyor oven by Middleby-Marshall and baked for four minutes. Upon removal from the oven, the pan was flipped over, the pasta product dropped out, was allowed to cool to room temperature and then frozen. The product was later reheated in a microwave oven and eaten. The product was firm enough to provide a hand-held host for toppings including liquids, yet was not pasty but retained the *al dente* character. The egg white binding agent was unnoticeable by sight or taste, except for the adherence of the linguine strands to each other and to the broccoli and onion.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method for preparation of pasta-based food product, comprising the steps of:

mixing a plurality of discrete pieces of cooked pasta with a binding composition comprising a binding agent, in a cooked pasta to binding agent weight ratio of from about 40:1 to about 10:1, to form a pasta/finding agent mixture;

forming a desired amount of the mixture into a desired shape; and baking the desired shape in a manner to adhere together the discrete pieces of cooked pasta to form a mass, containing voids free of binding agent, yet being sufficiently rigid to be held by hand and retain in the pasta a desired texture and degree of moistness;

the binding agent being selected from the group consisting of (1) soy protein and (2) egg white compositions comprising a sufficient proportion of egg white to permit the adherence of the discrete pieces of cooked pasta by the baking step.

2. A method as set forth in claim 1 wherein the binding agent is an egg white composition.

3. A method as set forth in claim 2 wherein the pieces of pasta are in the form of long, thin noodles.

4. A method as set forth in claim 3 wherein the pieces of pasta are pieces of linguine.

5. A method as set forth in claim 4, further comprising the step of cooking a plurality of discrete pieces of pasta in water at about 200° F. to about 212° F. for about 12 to about 15 minutes to form the pieces of cooked pasta.

6. A method as set forth in claim 2 wherein the cooked pasta to egg white composition weight ratio is from about 40:1 to about 25:1.

7. A method as set forth in claim 6 wherein the egg white composition is powdered egg white mixed with water in a powdered egg white to water weight ratio of from about 1:3 to about 1:4.

8. A method as set forth in claim 7 wherein the powdered egg white to water ratio is about 1:3.

9. A method as set forth in claim 7 wherein the binding composition further comprises seasonings.

10. A method as set forth in claim 7 wherein other foods are mixed with the cooked pasta before the baking step.

11. A method as set forth in claim 10 wherein the other foods are selected from the group consisting of vegetable pieces, pieces of delicatessen meats, mushrooms, olives and combinations thereof.

12. A method as set forth in claim 2 wherein the desired shape is formed by placing the amount of mixture into a pan of preselected shape, spreading the amount of mixture in the pan and tamping down the amount of mixture to a desired height.

13. A method as set forth in claim 12 wherein the desired shape of mixture is baked by placing the pan containing the desired shape into an oven of about 500° F. for about four minutes.

14. A method as set forth in claim 2, further comprising the step of chilling the cooked pasta before the mixing step.

15. A method as set forth in claim 2, further comprising the step of freezing the baked shape.

16. A method as set forth in claim 2, further comprising the step of adding a food topping to the baked shape.

17. A method as set forth in claim 2 wherein the egg white composition is selected from the group consisting of fresh egg whites and reconstituted egg whites.

18. A method as set forth in claim 2 wherein the egg white composition is selected from the group consisting of fresh egg whites, a mixture comprising egg whites and water, frozen egg whites, fresh whole eggs, frozen whole eggs, a mixture comprising whole egg powder and water, and mixtures thereof.

* * * * *